March 7, 1939.  J. M. BING  2,149,250
PHOTOMETER
Filed Feb. 26, 1938  3 Sheets-Sheet 1

INVENTOR.
Joseph M. Bing
BY
ATTORNEY.

March 7, 1939.  J. M. BING  2,149,250
PHOTOMETER
Filed Feb. 26, 1938.  3 Sheets-Sheet 2

INVENTOR.
Joseph M. Bing
BY
ATTORNEY.

INVENTOR.
Joseph M. Bing
BY
ATTORNEY.

Patented Mar. 7, 1939

2,149,250

UNITED STATES PATENT OFFICE 2,149,250

PHOTOMETER

Joseph M. Bing, New York, N. Y.

Application February 26, 1938, Serial No. 192,694

9 Claims. (Cl. 88—23)

The present invention relates to photometers and a novel method of operating the same, more particularly for measuring the brightness of a photographic scene or image to determine or control the proper exposure conditions to obtain a correctly exposed picture.

An object of the invention is the provision of a photometer device for measuring the intensity of both direct and reflected light for example of a photographic scene or negative whereby the adjustment is carried out purely acoustically by ascertaining predetermined variations including the appearance and disappearance of an audible signal.

Another object is the provision of a novel apparatus for and a method of photographic exposure control operated acoustically by ascertaining a predetermined variation such as the appearance and disappearance of an audible signal.

A further object is to provide an exposure control system comprising an exposure calculating device capable of adjustment by ascertaining a predetermined change or variation of an audible signal according to any given scene brightness, negative density or the like.

A further object is the provision of an exposure control system for adjusting an exposure controlling element in a camera, printing, enlarging or other reproducing apparatus automatically by acoustical indicating means such as by ascertaining a predetermined variation including the appearance and disappearance of an audible signal.

Another object is the provision of an acoustically operated densitometer and a method of operating the same.

Figure 1:
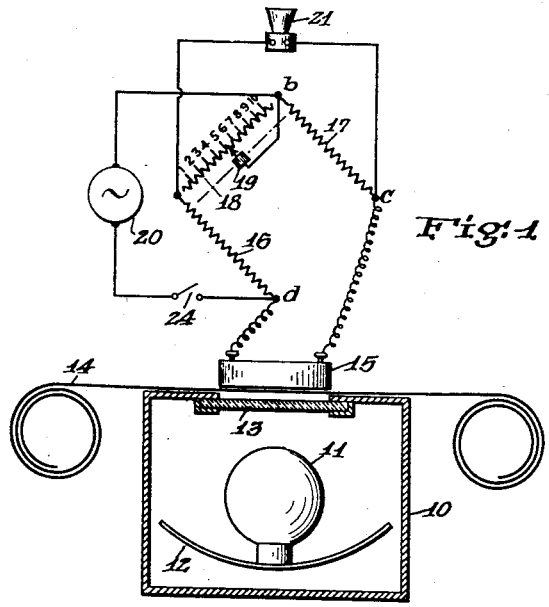
Figure 2:
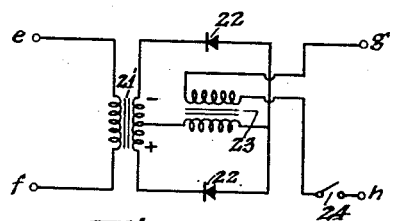
Figure 4:
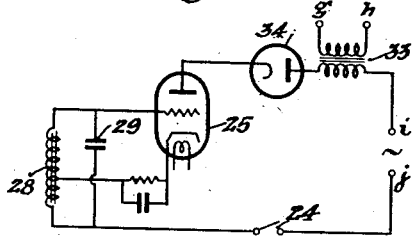
Figure 5:
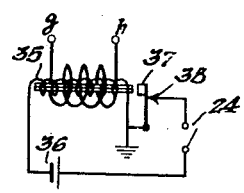
Figure 6:
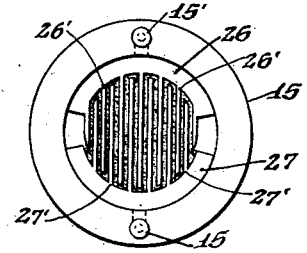
Figure 7:
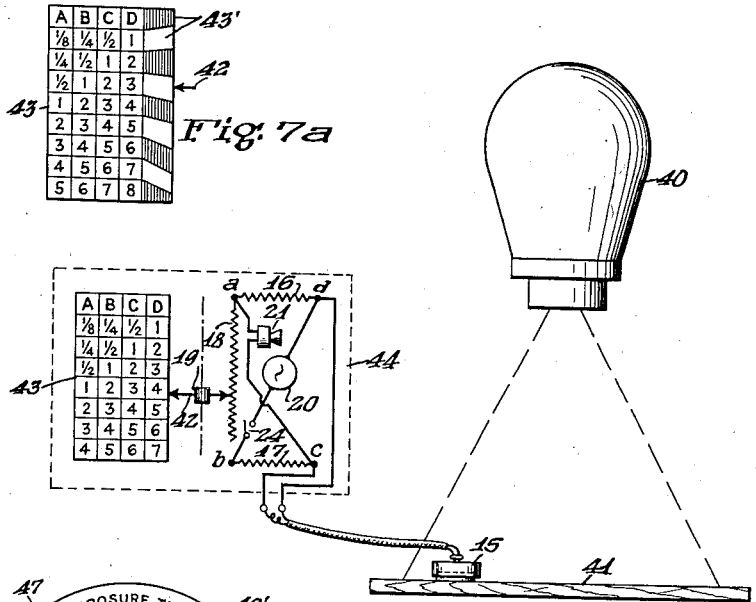
Figure 9:
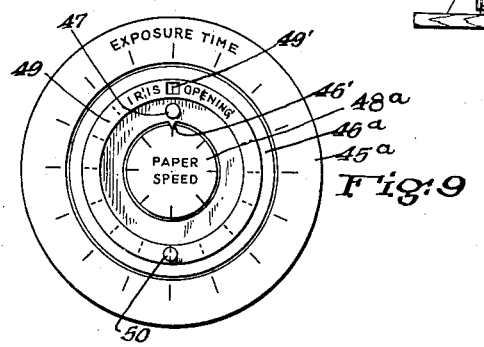
Figure 8:
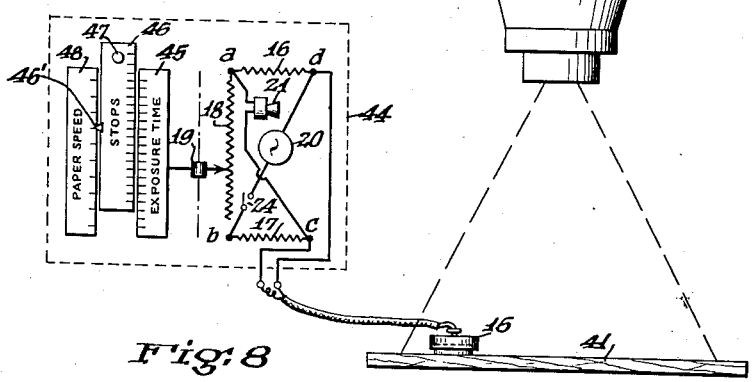
Figure 10:
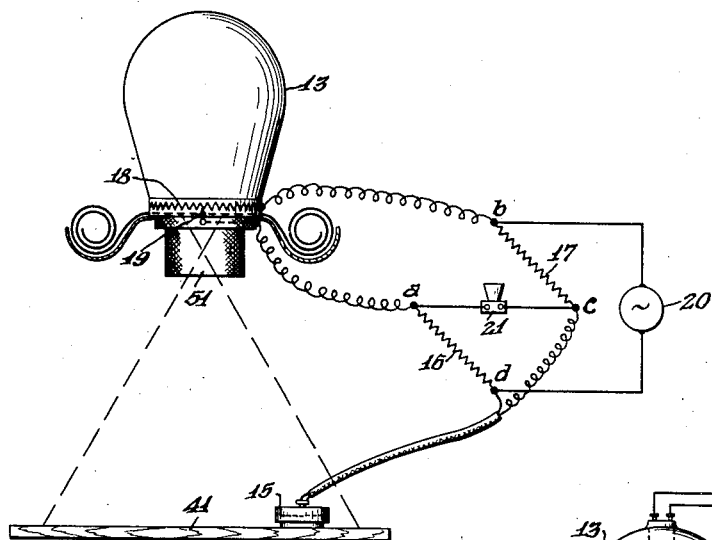
Figure 11:
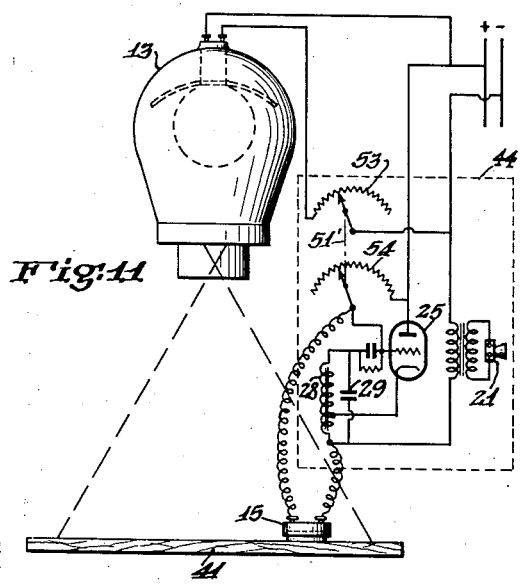
Figure 12:
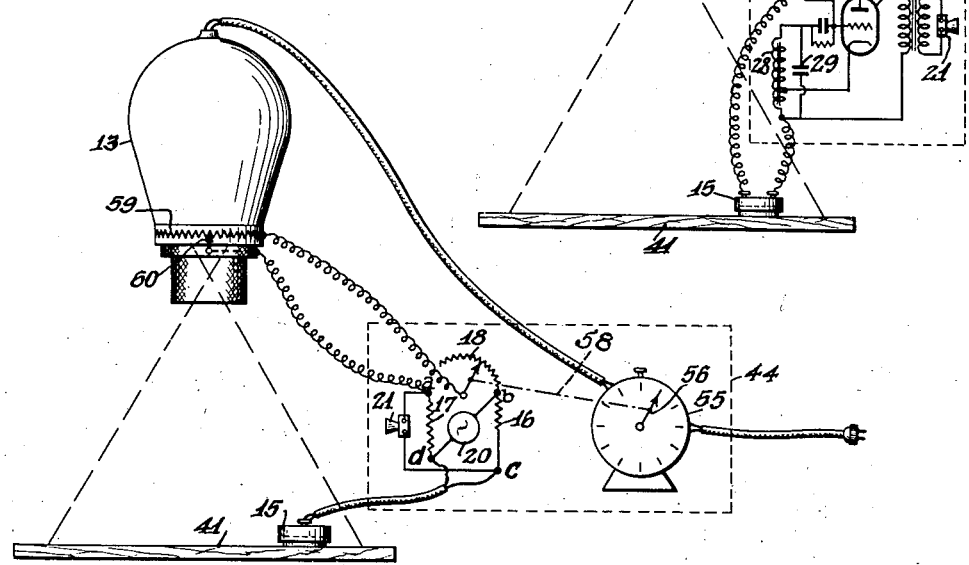

The above and further objects and advantages of the invention will be more fully understood from the following detailed description taken with reference to the accompanying drawings forming part of this specification and wherein;

Figure 1 diagrammatically illustrates a photometer adapted for measuring the density of a photographic negative or of any other material in accordance with the invention, Figures 2 to 5 are diagrams showing current supply sources suited for use in an apparatus of the type according to Figure 1, Figure 6 shows a photoelectric cell adapted for use in a system according to Figure 1, Figures 7 and 7a illustrate a manually operable exposure control device according to the invention comprising a photometer and an exposure calculator or table operatively associated therewith, Figure 8 illustrates a modification of an exposure calculator of the type according to Figure 7, Figure 9 shows a modification of a scale device for use in connection with Figure 8, Figure 10 illustrates an automatic exposure control system according to the invention operatively connected to an enlarging apparatus, Figures 11 and 12 illustrate modifications of exposure control arrangements of the type according to Figure 10.

Similar reference characters designate similar parts throughout the different views of the drawings.

With the above objects in view, the invention in its preferred embodiment contemplates the employment of acoustical signalling means for indicating the proper setting of an exposure calculator (manual operation) or for indicating the proper adjustment of an exposure determining element (automatic operation) in accordance with a given scene brightness or negative density in taking a photographic picture, printing or enlarging a negative or in carrying out any other reproduction process.

Although the invention will be described specifically in connection with printing or enlarging negatives in which case the employment of an acoustical signal results in added advantages and convenience when working in a dark room by reducing or completely dispensing with any visual readings or observations, it will be evident that the novel principle of and arrangements according to the invention apply analogously to the taking of pictures in a camera in particular a viewing camera as well as to other processes of reproduction such as to the known half tone or lithographic process and others as will be readily understood from the following.

Referring to Figure 1 of the drawings, there is shown a photometer system constructed in accordance with the invention for measuring the density of photographic negatives in accordance with the integrating method although not limited thereto. There is shown at 10 a box or casing having mounted therein a source of illumination such as an electric bulb 11 in conjunction with a reflector 12 adapted to concentrate the light emitted by the bulb upon an opening or film gate in the top wall of the casing through an opal glass disc 13 or equivalent diffusing member ensuring even and uniform illumination of a negative or image frame of a film strip 14 such as a miniature type film placed in the film gate as shown in the example illustrated. There is further shown at 15 a photoelectric cell of the variable resistance type such as a selenium cell or an equivalent device placed over the negative in the film gate with its light sensitive surface directed towards the film, the density of which is to be determined.

A bottom view of a resistance type selenium cell construction suited for the purpose of the invention is shown in Figure 6. The cell shown in the latter comprises a circular housing or support with the light sensitive element mounted in a recess thereof and comprising a pair of arcuate electrodes 26 and 27 having comb-like extensions or teeth 26' and 27', respectively, spaced and mutually engaging each other in the manner shown and with a space therebetween occupied by a thin layer of selenium in a manner well known in the construction and manufacture of selenium resistance cells of this type. The electrodes 26 and 27 are electrically connected to prongs or terminals 15' for inserting the cell in an electrical circuit.

Returning to Figure 1, the photoelectric cell 15 is arranged to form one arm of a Wheatstone bridge circuit comprising a further variable balancing resistance 18 forming the bridge arm opposite to the cell 15 and a pair of additional resistances 16 and 17 of equal resistance value forming the remaining two opposite arms and completing the bridge circuit. The variable resistance 18 may be adjusted by means of a slider or movable contact 19 to balance the resistance of the photoelectric cell 15 which latter, as is known, varies in accordance with the intensity of the light striking the same. One pair of diagonal terminals of the bridge circuit, in the example illustrated the terminals $b$—$d$, are connected to a suitable source of alternating potential having a frequency within the audible range while the remaining diagonal points $a$—$c$ of the bridge are connected to an acoustic reproducing device or sounder 21 such as an electro-mechanical vibrator, buzzer, telephone, loud speaker, or the like adapted to transform the variations of the source 20 into corresponding sound variations. The function and operation of the system described is as follows:

If the film 14 under scanning or other element being tested has a maximum transparency or minimum density, the photoelectric cell will be struck by light of great intensity resulting in a small value of its electrical resistance. Thus, if the balancing resistance 18 differs from the resistance of the photoelectric cell, the bridge will be unbalanced and electrical energy will be transmitted from the source 20 to the reproducer 21 and an audible signal generated by the latter. By moving the slider or contact 19 to a point where the resistance 18 is equal to the resistance of the photoelectric cell, the bridge circuit will be balanced and no potential difference will exist between the points $a$—$c$ resulting in a silencing of the sound generator 21. If the density of the negative increases, it will be necessary to increase the resistance 18 by moving the slider 19 to a new point to restore the balance of the bridge circuit ascertained by the disappearance of the audible signal produced by the sounding device 21. Thus, by calibrating the resistance 18 according to different positions of the slider or variable contact 19, the density of the negative can be directly read from the calibrating scale.

As is evident, the arrangement described is not limited to the measurement of the integrated density value of a negative as shown in the example chosen for illustration, but may be used with equal advantage in determining the intensity of any light source including both direct and reflected light. Thus, the device illustrated may be employed as a photometer for testing different light sources, such as electric bulbs or for measuring characteristic physical and chemical properties of materials by measuring their transparency or opacity in a most simple and efficient manner by relieving the operator from observing fixed index marks or scales or perform other visual adjustments, except for the final reading of the measured light intensity, negative density or other physical property to be tested or determined.

Instead of measuring the average or integrated density of a photographic negative as shown, the photocell 15 may serve to scan a desired portion of preferred pictorial value of a relatively large negative such as a film or plate or alternatively of the image projected upon the ground glass of a camera or upon the base board or easel of a photographic enlarging apparatus or the like for determining the proper exposure values in taking a picture or in printing or enlarging a negative or in carrying out any other reproduction process to ensure a final image of desired pictorial quality.

In the example illustrated in Figure 1, the resistance 18 is calibrated in units from 1 to 10 representing relative light intensity or negative density. Thus, by determining the sensitivity or speed of a negative material such as a film, plate or paper, which can be found once and for all by experiment, it is possible to find the correct exposure data from the number read on the scale associated with the resistance 18 for a given scene brightness or negative density in relation to other exposure controlling factors. For working in a dark room the position of the slider or contact 19 may be marked by successive notches corresponding to the successive calibration marks. The number of notches over which the slider has to be moved from an initial or starting position to silence the sound generator 21 may be counted thereby substantially avoiding any visual observation or reading. In case of enlarging a negative, the varying density values measured may be taken care of in the exposure by varying the stop or lens opening of the enlarging apparatus, by varying the exposure time or any other exposure determining factor in proportion to the number of notches counted for any negative, once the sensitivity of the enlarging paper used has been determined by experiment.

As is well known, the electrical resistance of a selenium cell increases approximately according to a square law with decreasing illumination or intensity of light striking the sensitive surface of the cell. As a result thereof the calibration scale of the resistance 18 will normally be of the quadratic type if a resistance is used which varies linearly with the displacement of the slider or contact 19. If a linear calibration is desired the resistance can be designed to follow a square law by varying the winding pitch in a wire wound resistance or in any other well known manner. In this manner the calibration scale can be given any desired relation relative to the inherent law of variation of the resistance of the photoelectric cell to suit any special requirements. In the example illustrated the resistance 18 in order to obtain a linear calibration of light intensities has to be designed in such a manner as to increase at a lesser rate at the beginning from its zero position and to increase with a greater rate for equal displacements of the slider or contact 19 according to a square law relationship.

The source 20 supplying a current in audible range may be of any suitable type known. Thus, the points b—d of the bridge circuit may be connected to a 60 cycle house lighting circuit either directly or through a transformer. In the latter case, a hum-like sound of low pitch is generated by the device 21. If a higher and more pleasant sound is desired the current from the 60 cycle lighting circuit may be applied through input terminals e—f, Figure 2, to a first step down transformer 21', the secondary of which has connected thereto a pair of rectifiers such as copper oxide rectifiers 22 forming a double wave rectifying system including an output transformer connected between the center tap of the secondary of transformer 21' and the common terminal of the rectifiers 22 in a manner well known in the art. From the terminals g—h of the secondary of the transformer 23 there is obtained in this manner a potential varying at twice the frequency of the input potential, that is at 120 cycles if the system is connected to a commercial power line or house lighting circuit and resulting in a higher pitched, more pleasant and more easily discernible tone. Item 24 represents a switch which may be combined with the switch for the light source 11 to place the system in operative condition.

Figure 3:
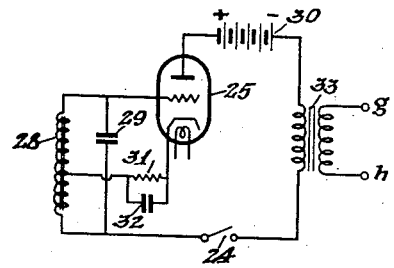

A further possible current source consists in the use of an electron tube oscillator shown diagrammatically and by way of example in Figure 3. In the latter, item 25 represents a three electrode vacuum tube well known in the radio and allied arts and having a cathode, an anode and a grid. A resonant electric circuit comprising an iron core inductance coil 28 shunted by a condenser 29 has one terminal connected to the grid and the other terminal to the anode of the tube in series with a switch 24, the primary of an output transformer 33 and a high potential source 30 as shown. The cathode is connected to a tap point of the inductance 28 through a biasing resistance 31 shunted by a condenser 32. As is known to those skilled in the art, an arrangement of this type is capable of generating sustained electric oscillations having a frequency determined by the electrical constants of the circuit 28, 29. The latter may be adjusted to obtain any frequency within the audible range with an oscillating potential at the secondary terminals g—h of the transformer 33 applied to the points b—d of the Wheatstone bridge in Figure 1, resulting in a desired pitch of the sound produced by the device 21.

In the oscillator system according to Figure 3, a direct current high potential source is required making it necessary to use either high tension dry batteries or operate the system from a direct current power or lighting system. If the oscillator is to be operated from both direct and alternating current an arrangement may be used as shown in Figure 4 which differs from Figure 3 by the inclusion of a diode rectifier 34 having its cathode connected to the anode of tube 25 and having its anode connected to one pole of the power circuit, connected in the example shown to terminals i—j. Such a system may be used for either direct or alternating current.

Referring to Figure 5, another alternating current generator is shown capable of operation by a small flashlight battery 36. This generator is of the interrupter or vibrating type comprising an iron core inductance coil 35, a vibrating armature 37 and contact 38 associated therewith in a manner well known. By closing the switch 34, the current through the circuit is periodically interrupted and a corresponding alternating current obtained from the output terminals g—h in the secondary winding placed over the induction coil 35. As is understood, any other known alternating current source may be employed for the purpose of the invention.

Referring to Figure 7, there is illustrated an exposure determining arrangement according to the invention operatively associated with a table of exposure values for different negative materials. In this figure which shows the invention associated with an enlarging apparatus, item 40 represents the usual housing enclosing the source of illumination, the condenser, the enlarging lens and film or plate holder, and 41 represents the base board or enlarging easel upon which the negative is projected. In carrying out the operation of an exposure measurement, the photoelectric cell 15 which is connected through a flexible cord to the exposure meter arrangement mounted in a common casing 44, is placed with its light sensitive surface directed in an upward direction over a pictorially significant portion of the negative determinative of the correct exposure and the slider 19 adjusted in substantially the same manner as described in connection with the previous figures, until the disappearance of the signal produced by the sound device 21. There is further provided an index 42 operatively connected to the slider 19 and cooperating with an exposure table 43 comprising in the example illustrated four rows A, B, C, D of exposure time values, each row corresponding to a different film, plate or paper speed. After the slider 19 has been adjusted in the manner described, the proper exposure time is found opposite the index 42 in the respective column corresponding to the speed or sensitivity of the film or paper used which latter has been previously determined once and for all by experiment. As is understood, other exposure determining factors such as the lens opening or the intensity of the light source used in the enlarger have to remain constant.

If the movement of slider 19 and index does not follow a linear relation a suitable cam mechanism may be used as a connecting element between the slider 19 and index member 42 or a separate non-linear scale 43' may be provided cooperating with the index 42 as shown in Figure 7a and connected to the table 43 by guide lines or channels, thereby to correlate non-linear relation of the resistance 18 with a linear scale or table 43.

In Figure 8 there is shown a similar system to Figure 7 wherein provision is made for taking care of variable lens openings or stops of the enlarging apparatus. For this purpose the table 43 in Figure 8 is replaced by a slide rule type calculating or conversion device comprising a first movable scale 45 operatively connected with the slider 19, and calibrated in exposure time values, a second scale member 46 manually adjustable relative to the member 45 by means of a knob 47 and calibrated in lens diaphragm openings or stops and having an index 46' cooperating with a third fixed scale which may be carried by the casing 44 and calibrated in film, plate or paper speed values. The operation of this device is as follows: At first, the scale member 46 is set in such a manner that its index 46' is opposite a desired negative or paper speed on the fixed scale 48. After the slider 19 has been moved to a point where the audible signal disappears, any desired pair of coordinated exposure time and stop values may be directly read on the scales 45 and 46, respectively.

Referring to Figure 9, there is shown a circular scale arrangement suited for use in a system of the type according to Figure 8. The outer ring-shaped scale 45a is operatively connected with the variable resistance 18 which in this case is preferably of the rotary type well known per se. The intermediate ring-shaped scale 46a is adjustable by means of a knob 47 and calibrated in stop values, while the inner circular scale 48a calibrated in paper or film speed is fixed relative to the preceding scales substantially similar to the arrangement according to Figure 8. In order to enable only a single calibration of the intermediate or stop scale to be visible, the latter is covered by a further ring-shaped member 49 frictionally engaging the same and having a window or opening 49' and a knob 50 for rotating or setting it relative to the scale 46a. In operation, the member 49 is first set by means of the knob 50 until the desired iris opening or stop is seen through the window 49' whereupon the entire intermediate member 46a is rotated by means of the knob 47 until its index 46' is opposite the desired paper or film speed on the inner scale. The exposure time required is then directly read opposite the window 49' upon the outer scale 45a after adjusting the same by control of the variable resistance 18 to a point where the audible signal disappears.

Referring to Figure 10, there is shown a fully automatic exposure control system of the type according to the invention requiring no reading or conversion of any type to ensure a correctly exposed picture or print. According to this embodiment of the invention, the variable balancing resistance 18 is operatively connected with an exposure controlling element, in the example illustrated the adjusting element for the lens iris diaphragm of the enlarging apparatus whereby both the diaphragm opening and in turn the amount of light projected upon the enlarging easel and the balancing resistance are controlled in unison. In order to obtain a linear variation of the light intensity in accordance with varying negative density or brightness of the scanned portion of the negative projected upon the base board or enlarging easel, the resistance 18 is designed to follow a corresponding law for varying relative positions of the sliding contact operatively connected with the iris diaphragm adjustment in the example described. In the case of a resistance type selenium cell, the electrical resistance of which increases according to the square as a function of the decrease of the intensity of the light impinged upon it, the variation of the resistance 18 has to increase with the fourth power of the relative displacement of the contact 19 in order to obtain a linear increase of the amount of light projected upon the base board 41 with decrease of the intensity of the light projected from the negative upon the photoelectric cell or reflected from any other photographic scene and determining the proper exposure conditions, other factors such as the intensity of the source of illumination and the exposure time remaining constant. Thus by a system of the type according to Figure 10, after the speed or sensitivity values for the different enlarging papers has been determined by experiment, variable negative densities or different enlarging ratios are automatically compensated by adjusting the iris diaphragm of the enlarging apparatus to a point for which the audible signal generated by the device 21 disappears.

Referring to Figure 11, there is shown a modification of an automatic exposure control according to the invention wherein the varying intensity of the light reflected from the projected image upon the base board 41 is compensated by varying the degree of illumination by means of a dimming resistance 53 connected in the circuit of the source of illumination or electric bulb illuminating the negative plate or film. The embodiment according to Figure 11 further differs from the previous constructions in that the audible signal appears when the apparatus is set for proper exposure. For this purpose an electron tube oscillator is used as a source of sound currents, and a further circuit comprising the photoelectric cell 15 which may be of the selenium type or of the high vacuum type known, and a variable resistance in series therewith for controlling the starting of the oscillations or sound currents. The oscillator circuit is substantially similar to the circuit shown in Figure 3. There is additionally connected between the high tension operating source indicated by the plus and minus signs, which may be a power line or high tension battery, a circuit comprising in series a variable resistance 54 and the photoelectric cell 15. The junction between the resistance 54 and the photoelectric cell is connected to the grid of the vacuum tube 25 thereby determining the grid biasing potential and in turn controlling the starting point of the electrical oscillations or sound currents. Since the resistance of the photoelectric cell varies according to the illumination or intensity of the light impinged thereon, it is necessary in each case to adjust the resistance 54 to a different value to cause the generation of the oscillations and in turn a sound generated by the reproducer 21. Both resistors 53 and 54 are directly mechanically connected for uni-control and are designed to follow suitable laws of variation in such a manner that decreasing negative density or brightness of the projected image will be compensated by increased intensity of the illuminating light source in the enlarger and vice versa in a manner readily understood from the above.

Referring to Figure 12, there is shown another modification of the invention for full automatic exposure control. The photoelectric cell and Wheatstone bridge system are identical to the previous modifications. The variable balancing resistance is mechanically connected through a suitable connecting element indicated at 58 with the setting member of an automatic exposure timing device 55 of type well known comprising a clock and electric switch mechanism connected with the illuminating source and adjustable to automatically close and open the lighting circuit for varying exposure time intervals whereby the adjustment of the balancing resistance 18 will cause an automatic adjustment of the exposure time to compensate for a varying degree of reflected image brightness scanned or negative density, respectively. In order to take care of varying lens diaphragm openings or stops, there is provided a further variable resistance 59 in series with the balancing resistance 18 adjustable by a contact or slider 60 connected with the diaphragm adjusting element. In this manner, by property choosing the values and laws of variation of the balancing resistance 18 and the resistance 59, variable stops or diaphragm openings are automatically taken care of in the adjustment of the exposure time.

As pointed out, arrangements described in connection with the printing and enlarging of photographic negatives may be used with equal advantage in taking pictures with a camera or in connection with any other photographic reproduction method as is readily understood from the above.

It is understood that the arrangements shown in Figures 7, 8, 10—12 may be modified so as to include the photoelectric cell 15 in the casing housing the remaining elements such as the current source 20 (dry battery operating an interrupter or vibrator according to Figure 5 or other sound current generator), the sound generator 21, the Wheatstone bridge system and the scale or conversion device. Thus the photoelectric cell may be mounted in the top of a flat box or casing with its light sensitive surface directed upwardly and with the remaining elements mounted within the casing except the scale or conversion device arranged upon the top of the casing next to the photoelectric cell. In use the casing is placed over the desired portion of the projected negative image upon the enlarger easel and the exposure time or other exposure determining magnitude read from the scale after the sounding device has been silenced in the manner described hereinbefore.

As is further evident from the foregoing, the invention is not limited to the specific arrangements shown and methods disclosed for illustration and it will be understood that the underlying principle and inventive concept are susceptible of numerous modifications and variations coming within the broader scope and spirit of the invention as defined in the appended claims. The specification and drawings are accordingly to be regarded in an illustrative rather than a limiting sense.

What I claim is:

1. A photometer arrangement comprising a photoelectric device capable of varying its electrical resistance in accordance with the intensity of light striking the same, a Wheatstone bridge circuit comprising said photoelectric device, a variable balancing resistance and a pair of further fixed resistances, a source of alternating current having a frequency in audible range connected to a pair of diagonal terminals of said bridge, an electric sound reproducing device connected to the remaining terminals of said bridge, and scale means operatively associated with said balancing resistance and calibrated in intensity values of the light measured in the balancing conditions of said bridge.

2. A photographic exposure meter arrangement comprising a photoelectric device capable of varying its electrical characteristics in accordance with the intensity of light striking the same, an electrical circuit connected to said device comprising adjustable balancing means for compensating the effect of said device produced by varying intensities of the light striking the same, an acoustic indicator arranged to be controlled by the balance and unbalance condition of said circuit, and exposure calculating means having an adjusting element operatively connected to said balancing element.

3. A photographic exposure meter arrangement comprising a photoelectric device capable of varying its electrical characteristics in accordance with the intensity of light striking the same, an eletrical circuit connected to said device comprising adjustable balancing means for compensating the effect of said device caused by varying intensities of the light striking the same, an acoustic indicator arranged to be controlled by the balance and unbalance condition of said circuit, and exposure calculating means comprising relatively movable scales, one of said scales being operatively connected to said balancing means.

4. A photographic exposure meter arrangement comprising a photoelectric device capable of varying its electrical resistance in accordance with the intensity of light striking the same, a Wheatstone bridge circuit comprising said photoelectric device, an adjustable balancing resistance forming two opposite arms of said bridge and a pair of further fixed resistances completing the bridge circuit, a source of alternating current having a frequency in audible range and connected to a pair of diagonal terminals of said bridge, an electric sound reproducing device connected to the remaining terminals of said bridge, and exposure calculating means having at least one movable member operatively connected to said balancing resistance.

5. In photographic apparatus, the combination of a photoelectric device capable of varying its electrical resistance in accordance with the intensity of light striking the same and being determinative of exposure conditions, a Wheatstone bridge circuit comprising said photoelectric device, an adjustable balancing resistance opposite to said device and a pair of further equal resistances completing the bridge circuit, a source of alternating current having a frequency in audible range connected to a pair of diagonal terminals of said bridge, an electric sound reproducing device connected to the remaining terminals of said bridge, and an exposure controlling element of said apparatus operatively connected to said balancing resistance.

6. In photographic apparatus, the combination of a photoelectric device capable of varying its electrical resistance in accordance with the intensity of light striking the same and being determinative of exposure conditions, a Wheatstone bridge circuit comprising said photoelectric device, an adjustable balancing resistance opposite to said device and a pair of further equal resistances completing the bridge circuit, a source of alternating current having a frequency in audible range connected to a pair of diagonal terminals of said bridge, an electric sound reproducing device connected to the remaining terminals of said bridge, an optical lens in said apparatus having an adjustable diaphragm, said diaphragm being operatively connected to said balancing resistance.

7. In photographic apparatus, the combination of photoelectric means for producing an electric current varying in accordance with the intensity of light striking the same and being determinative of exposure conditions, adjustable balancing means for compensating the effect of current variations produced by said photoelectric means, audible signal means to indicate the balance and unbalance condition, and an exposure timing device for said apparatus operatively connected to said balancing means.

8. In photographic apparatus, the combination of a photoelectric device capable of varying its electrical resistance in accordance with the intensity of light striking the same and being determinative of exposure conditions, a Wheatstone bridge circuit comprising said device, and adjustable balancing resistance opposite to said bridge, and a pair of equal resistances completing said bridge, a source of current connected to one pair of diagonal terminals of said bridge, electric sound generating means connected to the remaining terminals of said bridge and controlled by the balance and unbalance condition of said bridge, first exposure controlling means for said apparatus having an adjustable member operatively connected to said balancing means, further exposure controlling means for said apparatus, and a further variable resistance in series with said balancing resistance and operatively connected to said further exposure controlling means.

9. A photographic exposure meter arrangement comprising a photoelectric device capable of varying its electrical resistance in accordance with the intensity of light striking the same, a Wheatstone bridge circuit comprising said photoelectric device and an adjustable balancing resistance forming two opposite arms of said bridge, a pair of further fixed resistances completing the bridge circuit, a source of alternating current having a frequency in audible range connected to the remaining terminals of said bridge, and an exposure calculator having a first movable scale member calibrated in exposure times and operatively connected to said balancing resistance, a second movable scale member calibrated in diaphragm openings and arranged adjacent to and cooperating with said first scale, and a third scale member fixed relatively to said first and second scale members calibrated in emulsion speeds, said second scale member having an index cooperating with said emulsion speed scale.

JOSEPH M. BING.